(12) United States Patent
Piipponen et al.

(10) Patent No.: US 9,026,156 B2
(45) Date of Patent: May 5, 2015

(54) METHOD AND APPARATUS PROVIDING IN-DEVICE CO-EXISTENCE SIGNALING

(71) Applicant: Nokia Corporation, Espoo (FI)

(72) Inventors: Antti Piipponen, Vantaa (FI); Lars Dalsgaard, Oulu (FI); Petri Vasenkari, Turku (FI); Jussi-Pekka Koskinen, Oulu (FI); Sari Nielsen, Espoo (FI)

(73) Assignee: Nokia Corporation, Espoo (FI)

( * ) Notice: Subject to any disclaimer, the term of this patent is extended or adjusted under 35 U.S.C. 154(b) by 267 days.

(21) Appl. No.: 13/666,401

(22) Filed: Nov. 1, 2012

(65) Prior Publication Data

US 2013/0303215 A1 Nov. 14, 2013

Related U.S. Application Data

(60) Provisional application No. 61/556,539, filed on Nov. 7, 2011.

(51) Int. Cl.
*H04W 24/02* (2009.01)
*H04W 72/12* (2009.01)
*H04W 28/04* (2009.01)

(52) U.S. Cl.
CPC .......... *H04W 24/02* (2013.01); *H04W 72/1215* (2013.01); *H04W 28/048* (2013.01)

(58) Field of Classification Search
CPC ......... H04W 4/02; H04W 4/008; H04W 4/06; H04W 4/10; H04W 4/12; H04W 4/14; H04W 24/02; H04W 28/00; H04W 28/02; H04W 28/048; H04W 72/00; H04W 72/005; H04W 72/085; H04W 72/1226; H04W 72/1231

USPC ............... 455/501, 63.1, 67.11, 115.2, 115.1, 455/423, 436, 442, 452.2, 552.1, 522, 455/553.1; 370/252, 241, 342, 335, 329, 370/328

See application file for complete search history.

(56) References Cited

U.S. PATENT DOCUMENTS

| 7,991,413 | B2 | | 8/2011 | Honkanen et al. | |
|---|---|---|---|---|---|
| 8,437,798 | B2 | * | 5/2013 | Fabien et al. | 455/552.1 |
| 8,457,091 | B2 | * | 6/2013 | Pani et al. | 370/342 |
| 8,817,641 | B2 | * | 8/2014 | Choi et al. | 370/252 |
| 8,818,356 | B2 | * | 8/2014 | Young et al. | 455/423 |
| 2002/0193139 | A1 | * | 12/2002 | Mildh et al. | 455/552 |
| 2006/0046765 | A1 | * | 3/2006 | Kogure | 455/522 |
| 2010/0279679 | A1 | * | 11/2010 | Young et al. | 455/423 |
| 2010/0319033 | A1 | | 12/2010 | Auranen et al. | |
| 2012/0182896 | A1 | * | 7/2012 | Jang et al. | 370/252 |
| 2012/0207038 | A1 | * | 8/2012 | Choi et al. | 370/252 |
| 2013/0223391 | A1 | * | 8/2013 | Koo et al. | 370/329 |
| 2013/0242919 | A1 | * | 9/2013 | Koo et al. | 370/329 |
| 2013/0301537 | A1 | * | 11/2013 | Lee et al. | 370/328 |

* cited by examiner

*Primary Examiner* — Tan Trinh
(74) *Attorney, Agent, or Firm* — Nokia Corporation

(57) ABSTRACT

In accordance with an example embodiment of the present invention, an apparatus, method and computer storage product are disclosed which compose a report at an apparatus having at least one network radio and at least one other radio, the report comprising in-device coexistence related information that combines information descriptive of potential and on-going interference to the at least one other radio as two orthogonal components comprised of power domain information and time domain information and transmit the report to a network station with which the apparatus communicates using the at least one network radio.

18 Claims, 9 Drawing Sheets

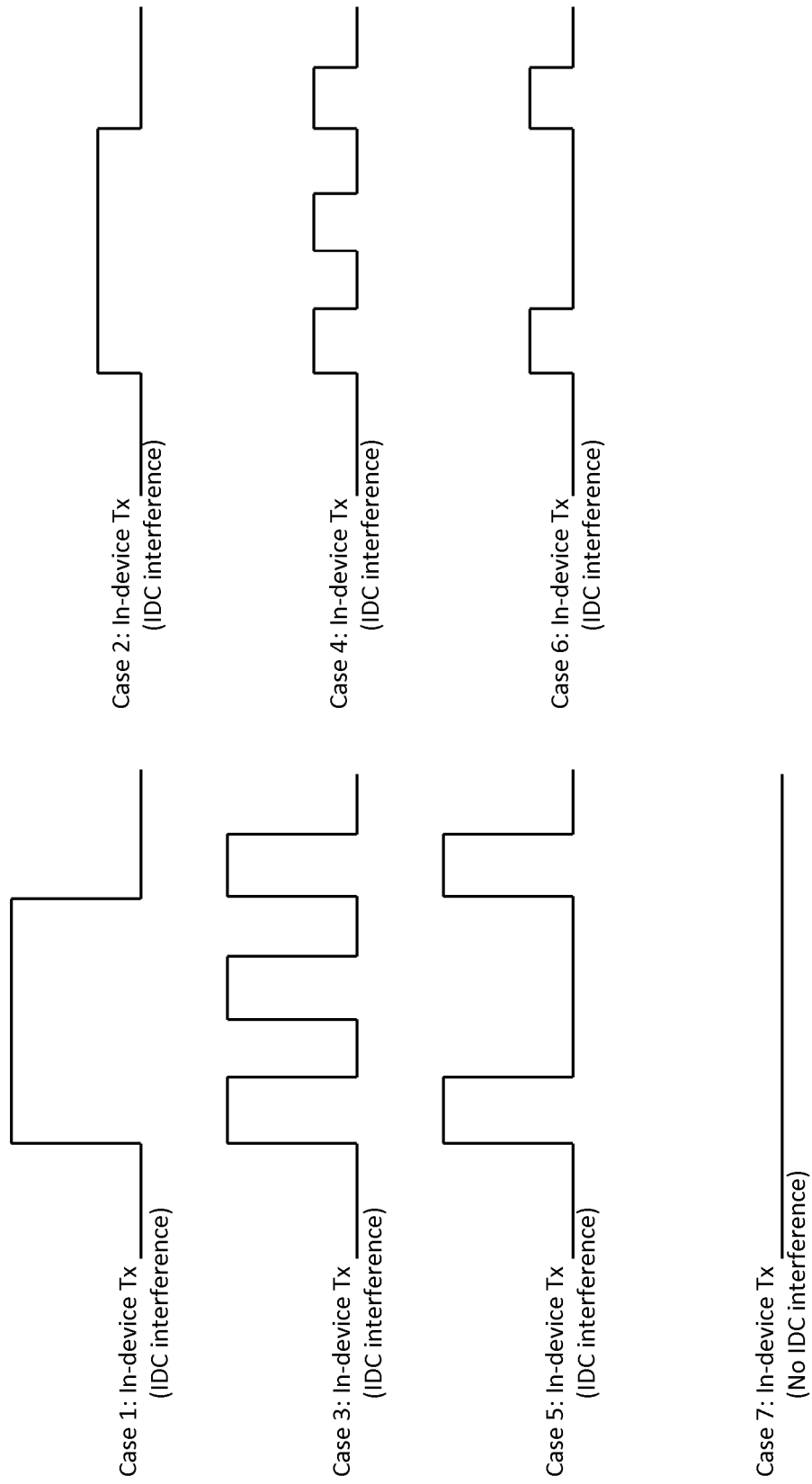

Amount of RF interference from Band7 LTE UL tx -> WiFi receiver, worst case assumptions.

METHOD AND APPARATUS PROVIDING IN-DEVICE CO-EXISTENCE SIGNALING

TECHNICAL FIELD

The exemplary and non-limiting embodiments of this invention relate generally to wireless communication systems, methods, devices and computer programs and, more specifically, relate to the co-existence of multiple radios in a user device and to techniques for a network access node to inform the user device of a potential and an on-going interference problem.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BT Bluetooth™
BW bandwidth
DL downlink (eNB towards UE)
eNB E-UTRAN Node B (evolved Node B)
EPC evolved packet core
E-UTRAN evolved UTRAN (LTE)
FDM frequency division multiplex
GNSS global navigation satellite system
GPS global positioning system
IDC in-device coexistence
IMTA international mobile telecommunications association
ISM industrial, scientific and medical (frequency bands)
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
NodeB base station
OFDMA orthogonal frequency division multiple access
O&M operations and maintenance
PDCP packet data convergence protocol
PHY physical (layer 1, L1)
Rel release
RLC radio link control
RRC radio resource control
RRM radio resource management
S-GW serving gateway
SC-FDMA single carrier, frequency division multiple access
TDM time division multiplex
UE user equipment, such as a mobile station, mobile node or mobile terminal
UL uplink (UE towards eNB)
UPE user plane entity
UTRAN universal terrestrial radio access network
Wi-Fi Wireless Fidelity, wireless local area network (WLAN) technology based on IEEE 802.11 standard.

IEEE 802.11 covers technologies certified as IEEE 802.11a/b/g/n/ac/ad/af/s/i/v for example.

One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V10.5.0 (2011 September) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) incorporated by reference herein in its entirety and referred to for simplicity hereafter as 3GPP TS 36.300.

FIG. 1A reproduces FIG. 4.1 of 3GPP TS 36.300 and shows the overall architecture of the E-UTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:

functions for RRM: RRC, Radio Admission Control, Connection Mobility Control, Dynamic allocation of resources to UEs in both UL and DL (scheduling);
IP header compression and encryption of the user data stream; selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Also of interest herein are the further releases of 3GPP LTE (e.g., LTE Rel-10) targeted towards future IMT-A systems, referred to herein for convenience simply as LTE-Advanced (LTE-A).

Reference in this regard may be made to 3GPP TR 36.913 V10.0.0 (2011-03) Technical Report 3rd Generation Partnership Project; Technical Specification Group Radio Access Network; Requirements for further advancements for Evolved Universal Terrestrial Radio Access (E-UTRA) (LTE-Advanced)(Release 10). Reference can also be made to 3GPP TR 36.912 V10.0.0 (2011 March) Technical Report 3rd Generation Partnership Project; Technical Specification Group Radio Access Network; Feasibility study for Further Advancements for E-UTRA (LTE-Advanced) (Release 10).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

Coexistence of LTE and WiFi/Bluetooth/GNSS (e.g., GPS) radios co-located in a small device such as a mobile phone (e.g., a UE) can create problems. When these radios use frequency bands with a narrow guard band, or have some harmonic relationship, a conventional filtering solution may not be possible. 3GPP RAN2 has an active work item to study and specify LTE network solutions to aid a problematic UE so that the UE can address the problem.

SUMMARY

Various aspects of examples of the invention are set out in the claims.

According to a first aspect of the present invention, an apparatus comprising at least one processor; and at least one memory including computer program code; the at least one memory and the computer program code configured to, with the at least one processor, cause the apparatus at least to: compose a report at the apparatus having at least one network radio and at least one other radio, the report comprising in-device coexistence related information that combines information descriptive of potential and on-going interference to the at least one other radio as two orthogonal components comprised of power domain information and time domain information; and transmit the report to a network station with which the apparatus communicates using the at least one network radio.

According to a second aspect of the present invention, composing a report at a user equipment having at least one network radio and at least one other radio, the report comprising in-device coexistence related information that combines information descriptive of potential and on-going interference to the at least one other radio as two orthogonal components comprised of power domain information and time domain information; and transmitting the report to a network base station with which the user equipment communicates using the at least one network radio.

BRIEF DESCRIPTION OF THE DRAWINGS

For a more complete understanding of example embodiments of the present invention, reference is now made to the following descriptions taken in connection with the accompanying drawings in which:

FIG. 1B FIG. 1B reproduces FIG. 1 from R2-115186 and illustrates potential ongoing vs. potential interference cases.

DETAILED DESCRIPTION

Figure 1A:
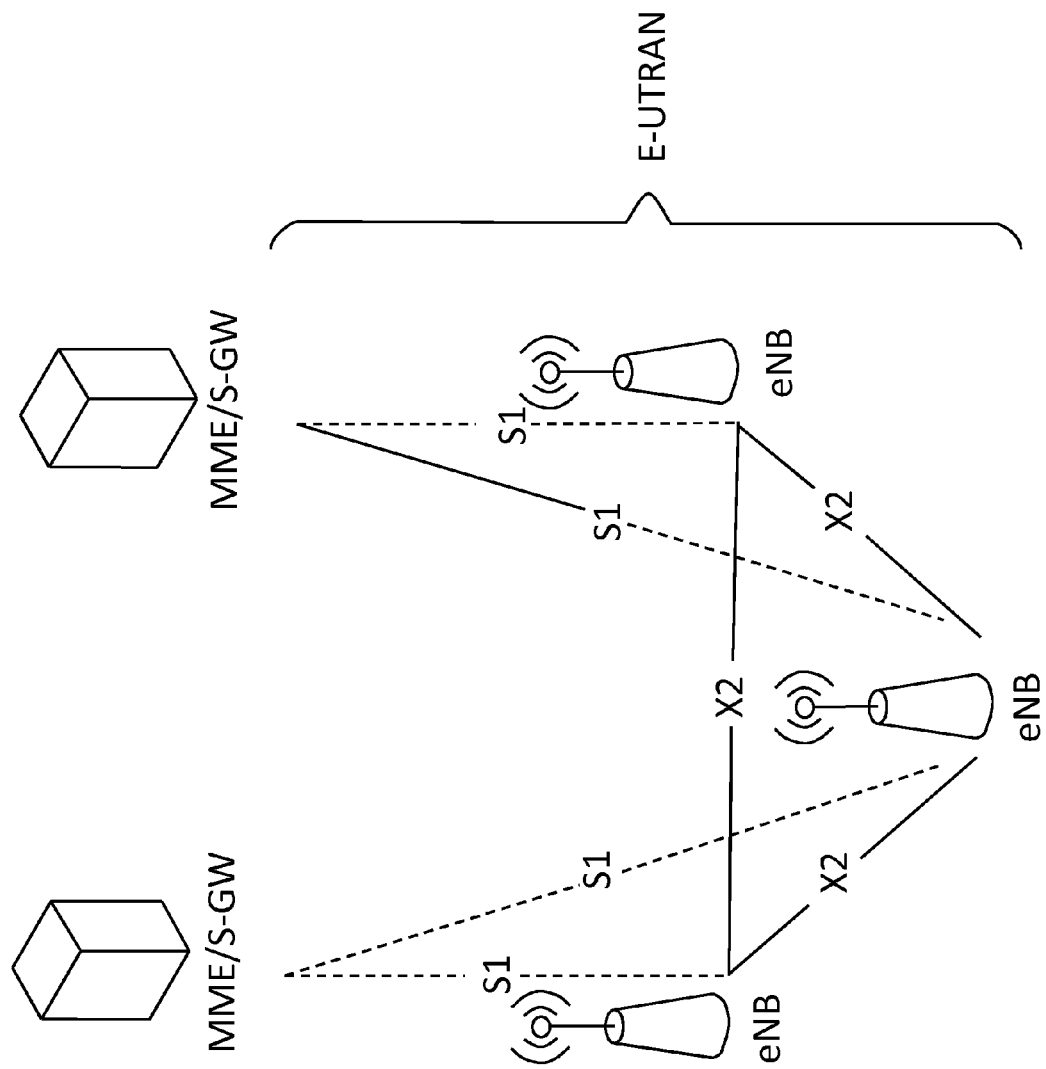
FIG. 1A reproduces FIG. 4.1 of 3GPP TS 36.300, and shows the overall architecture of the EUTRAN system.

An exemplary aspect of this invention relates to providing an indication of the IDC-related problems, and more specifically relates to how the problem condition is detected and how it is communicated to the network.

As was mentioned above, in order to allow users to access various networks and services ubiquitously, an increasing number of UEs are equipped with multiple radio transceivers. For example, a UE may be equipped with LTE, WiFi, and Bluetooth transceivers (operating on the 2.4 GHz ISM band), and GNSS receivers. One resulting challenge lies in attempting to avoid coexistence interference between those collocated radio transceivers, as new frequency bands with narrow or non-existing guard band definitions to existing allocations are being taken into use.

Due to extreme proximity of multiple radio transceivers within the same UE, the transmit power of one radio's transmitter may be much higher than the received power level of another radio's receiver. By means of filter technologies and sufficient frequency separation, the transmit signal may not result in significant interference. But for some coexistence scenarios, e.g., different radio technologies within the same UE operating on adjacent or harmonic frequency bands, current state-of-the-art filter technology may not provide sufficient rejection. Therefore, solving the interference problem by one single generic RF design may not always be possible and alternative methods need to be considered. This in-device interference challenge has been recognized in 3GPP by initiating a work item on signaling and procedure for interference avoidance for in-device coexistence, which follows a corresponding study item: 3GPP TR 36.816 V11.1.0 (2011 September) Technical Report 3rd Generation Partnership Project; Technical Specification Group Radio Access Network; Evolved Universal Terrestrial Radio Access (E-UTRA); Study on signalling and procedure for interference avoidance for in-device coexistence (Release 11), which is attached hereto as Exhibit A and incorporated by reference herein.

The 3GPP RAN2 study item phase concluded that the indication of IDC problems can be categorized into four scenarios:

(1) On-going interference on the serving LTE frequency;

(2) Potential interference (currently not on-going) on the serving LTE frequency;

(3) On-going interference on non-serving LTE frequencies; and (4) Potential interference (currently not on-going) on non-serving LTE frequencies.

A question arises as to whether (and how) potential interference should be indicated. One extreme is that the UE reports potential problems (on the possibly affected frequencies) as soon as it has WiFi or Bluetooth turned on. However, this indication has no useful information from the network perspective. The other extreme is that the UE reports problems once there is radio link failure due to IDC. However, this type of indication comes too late to take corrective action.

Some type of course of action that lies between these two extremes would thus appear to be a better choice. However, there is disagreement on how to implement the notification. For example, some believe that the interference should be measurable in order to limit the amount of unnecessary indications, and that the network should in any case take no action if the UE only reports potential problems. Some others have the opinion companies that for the LTE system to prepare for the problem condition, an indication should be sent before there is severe enough interference to cause an actual problem.

In R2-115186, 3GPP TSG-RAN WG2 Meeting #75bis, Zhuhai, China 10th-15 Oct. 2011, Triggering indication for assisting ICO, Source: Pantech, there is an attempt to clarify the meaning of potential vs. on-going interference. FIG. 1B herein reproduces FIG. 1 from R2-115186 and illustrates what cases are possible. In this Figure the x-axis denotes time and y-axis denotes the amount of RF interference at a victim in-device receiver. It can be seen that the interference can be constant (cases 1,2), frequent (cases 3,4), infrequent (cases 5,6), or occurring very infrequently (case 7), depending on the aggressor radio link traffic and activity. Further, due to transmit power levels, the amount of victim receiver desensitization can be high (left hand side cases) or low (right hand side cases). This contribution however provides no details as how to use this basic information, and no useful conclusions are drawn.

Further, it is not clear which of these cases would be considered on-going interference. There are at least two aspects to determining on-going interference.

(A) A first aspect relates to an amount of RF interference (power domain). If the interference at the victim receiver is strong enough so that the receiver's link margin becomes negative, all receive packets that collide with the aggressor transmissions can be considered lost. To determine whether the RF interference is strong enough a consideration can be made of the victim radio link margin, and the transceiver properties of both radios (static properties such as filter characteristics, transceiver linearity, and antenna isolation, as well as dynamic properties such as transmit power and received signal strength/quality).

(B) A second aspect relates to activity of the aggressor and the victim radios in the time domain (similar to duty cycle). If the aggressor radio utilizes most of the transmit opportunities (e.g., the LTE UL radio is scheduled in most sub-frames while the WiFi radio has a significant amount of data to transmit), the victim radio does not have many opportunities for uninterrupted packet reception. On the other hand, if the aggressor radio is only using transmit opportunities infrequently, the victim radio has much more freedom to operate. If the remaining time share for the victim radio cannot sustain the data throughput requirements (also taking into account re-transmissions due to lost transmission opportunities, etc.) one can characterize the aggressor radio activity in the time domain is being excessive.

If the power domain limit is not exceeded, the victim radio can operate freely without interference. If the time domain limit is not exceeded, the victim radio can still meet the radio link throughput and other quality requirements (e.g., possibly by using re-transmissions). Thus, for the IDC problem to be on-going, both the aggressor power and time activity should be above the limit. That is, for the IDC problem to be on-going, both the aggressor radio transmit power and time activity can be assumed to exceed the respective thresholds.

Figure 1C:
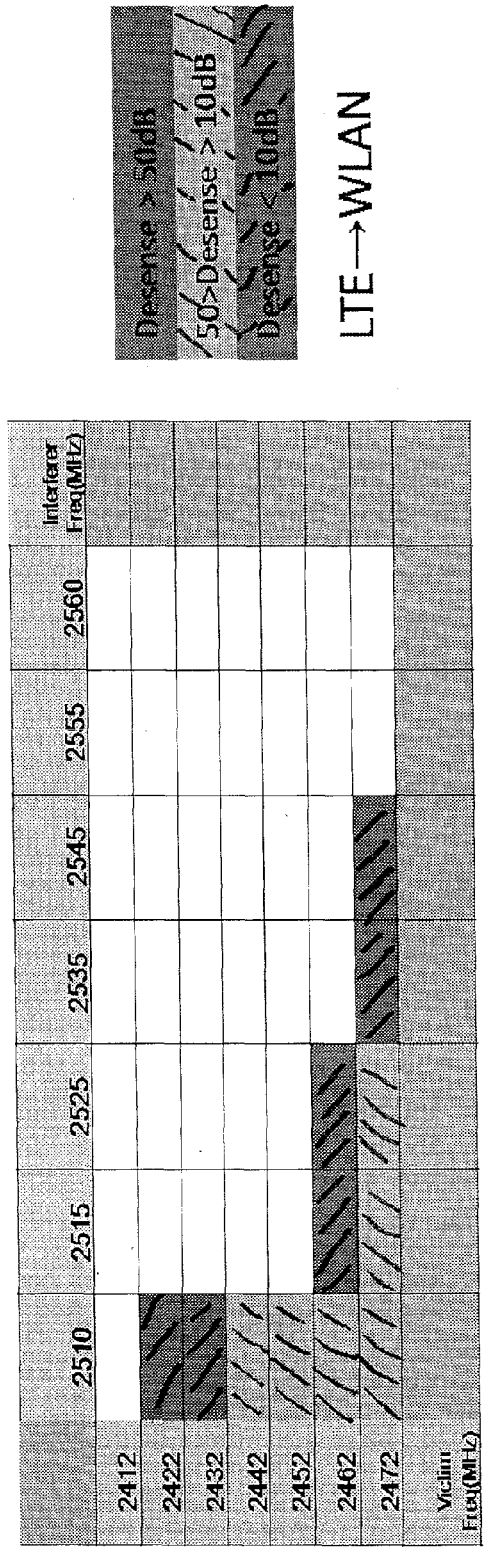
FIG. 1C reproduces a Figure from 3GPP TR 36.816 and illustrates the frequency dependency of desensitization.

The various RF interference analysis results annexed in 3GPP TR 36.816 further illustrate the frequency dependency of the desensitization (see in FIG. 1C herein). From the results it is clear that channel selection has a large impact on the interference. What is not visible in the results is how the interference "table" would change if LTE was not using the highest possible transmit power, which is a more typical case than using maximum output power (as shown in FIG. 1C). Also the interference "table" does not take into account the victim radio link margin. As such it is not possible to ascertain from the existing data alone whether a certain interference level is too high or is acceptable.

3GPP TR 36.816 provides simulation results of the amount of RF interference for the worst cases. In principle these analyses assume maximum LTE uplink transmission power (+23 dBm) and adequate band filters for both LTE and ISM radios.

When considering the effect of RF interference at a victim receiver, multiple interference mechanisms need to be taken into account. For example, the transmitter leaks unwanted emissions on the receive channel; the victim receiver has finite linearity and begins to overload by a strong blocking signal; and/or there may be frequency dependent non-linear effects such as intermodulation. To give an example, in the following analysis only receiver overloading due to blocking is considered, though the other effects can be considered as well.

Figure 4:
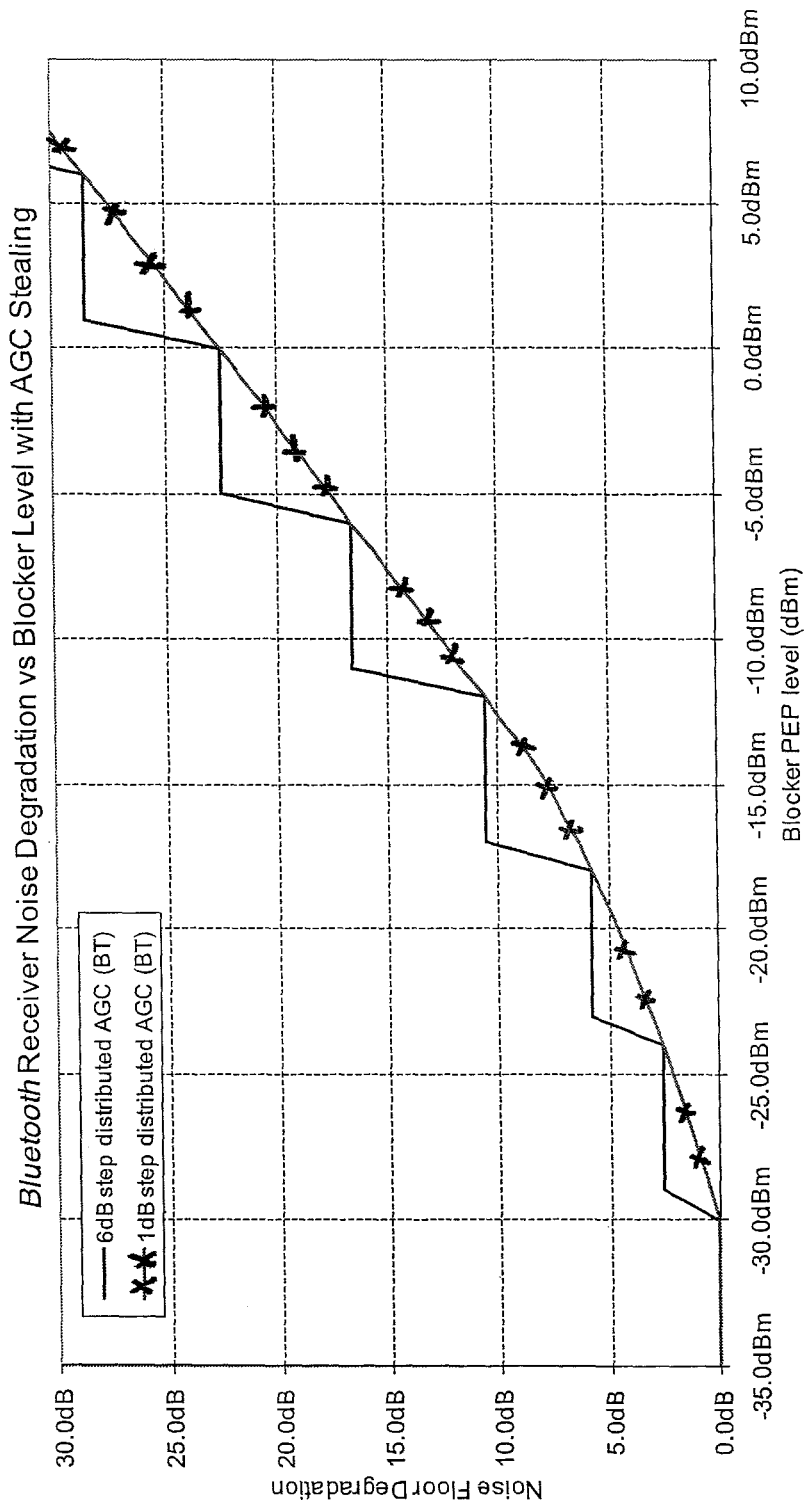
FIG. 4 reproduced from Filter Recommendations for Coexistence with LTE and WiMax, Bluetooth SIG, 31.3.2010, and illustrates an example of Bluetooth receiver blocking performance.

FIG. 4 shows the noise level degradation of an exemplary Bluetooth receiver due to a blocking signal. The receiver automatic gain control algorithm reduces the front-end gain as a response to a strong blocker, to prevent overloading. This increases the receiver noise figure, directly cutting the link margin.

FIG. 4 assumes peak envelope power, which is in the case of LTE UL the average power (maximum +23 dBm) plus the peak-to-average ratio, about 6 dB for single carrier transmission.

Before entering the Bluetooth receiver the LTE UL blocker is attenuated by antenna isolation (e.g., 10 dB can be assumed), and by the ISM band filter. This example assumes published filter data and focuses on the LTE band 7 uplink:

At least 5 dB attenuation on the 20 MHz channel at 2500-2520 MHz (total 15 dB with antenna isolation);

At least 10 dB attenuation on the 20 MHz channel at 2510-2530 MHz (total 20 dB with antenna isolation); and At least 24 dB attenuation on the 20 MHz channels with channel edge above 2520 MHz (total 34 dB with antenna isolation).

From this information it is possible to derive the receiver noise level increase when the LTE UL is transmitted at maximum power.

TABLE 1

Bluetooth receiver noise increase due to LTE UL blocker at maximum output power (example)

| | LTE carrier frequency (20 MHz carrier) | | |
|---|---|---|---|
| | 2510 MHz | 2520 MHz | 2530+ MHz |
| Maximum LTE UL transmit power | 23 dBm | 23 dBm | 23 dBm |
| Peak to average power | 6 dB | 6 dB | 6 dB |
| Antenna + filter attenuation | 15 dB | 20 dB | 34 dB |
| Maximum blocker level at receiver | 14 dBm | 9 dBm | −5 dBm |
| BT RX noise increase at maximum blocker level* | N/A | N/A | 18 dB |

*Only receiver blocker considered, unwanted emissions and other effects not taken into account If one allows a certain receiver noise increase at the Bluetooth receiver, for example to match the available link margin, it is possible to calculate the maximum LTE UL output power.

TABLE 2

Highest allowed LTE UL output power vs.
allowed BT RX noise increase (example)

| Allowed BT RX noise increase* | LTE carrier frequency (20 MHz carrier) | | |
|---|---|---|---|
| | 2510 MHz | 2520 MHz | 2530+ MHz |
| 0 dB | −15 dBm | −10 dBm | 4 dBm |
| 5 dB | −4 dBm | 1 dBm | 15 dBm |
| 10 dB | 2 dBm | 7 dBm | 21 dBm |
| 20 dB | 12 dBm | 17 dBm | 31 dBm |

*Only receiver blocker considered, unwanted emissions and other effects not taken into account Even though the above analysis only considers the receiver blocker and no other interference mechanisms, in general for a given UE with given filter and transceiver characteristics, it is possible to determine a threshold for the LTE UL transmit power (on the currently serving frequency), where an ISM or a GNSS receiver begins to suffer from intolerable interference with its current link margin.

When considering the ISM transmitter interference to LTE DL reception one can generally allow, e.g., 0-1 dB noise increase, making the power threshold quite low. In some cases, where the DL performance is not dominated by thermal noise, but rather inter-cell interference, some further noise increase could be allowed. However, in general if there is a possibility of ISM interference to the LTE DL it would be preferable to block the ISM transmitter in those sub-frames which the LTE modem needs to receive.

Thus, after considering the current radio link conditions the UE can determine an aggressor radio transmit power threshold, where the victim radio begins to suffer from interference. This can be considered as a power domain consideration.

Another consideration is the time domain. The time domain activity limitation for the aggressor radio can be determined by considering worst case interference conditions in the power domain (i.e. each packet reception colliding with a transmission burst fails), and then looking at the victim radio throughput requirements for the given use scenario.

3GPP TR 36.816 gives some guidelines:
LTE+BT earphone (Multimedia service):
The LTE scheduling period is to be less than 60 msec
The LTE unscheduled period is to be around [15-60] msec
LTE+WiFi portable router:
Scheduling periods and unscheduled periods should be typically not more than [20-60] msec.
The scheduled and unscheduled periods should be large enough for reasonable operation of the LTE and WiFi timelines.
Since LTE has typically lower data rate than the WiFi link, the LTE scheduling periods should be longer than the unscheduled periods in order to achieve approximately the same throughput on both links.
LTE+WiFi offload:
The scheduling and unscheduled periods should typically be not more than about 40-100 msec.
The scheduled and unscheduled periods should be large enough for reasonable operation of the LTE and WiFi timelines.
Aligning the LTE unscheduled period with WiFi beacons is important.
The ratio of the scheduling and unscheduled periods should be aligned to the ratio of the volume of non-offloaded and offloaded traffic.

In principle the TDM assistance information provided to the LTE system should at least indicate the minimum TDM conditions, or LTE pattern, that allows the non-LTE radio of the UE to operate, assuming IDC interference. Basically this can be considered as the time domain activity limit. In the analyses it would also be useful to consider how the freedom for eNB actions, such as eNB scheduling decisions, can be kept as high as possible (as unconstrained as possible). When the time domain activity limit is considered, instead of an explicit TDM pattern, more optimization freedom is left for eNB scheduling and RRM decisions for helping the UE with an IDC problem.

It should thus be clear that the time domain activity limit can be aligned with TDM assistance information.

The exemplary embodiments of this invention provide an explicit indication that couples the on-going and potential interference scenarios into one single report.

Figure 2:
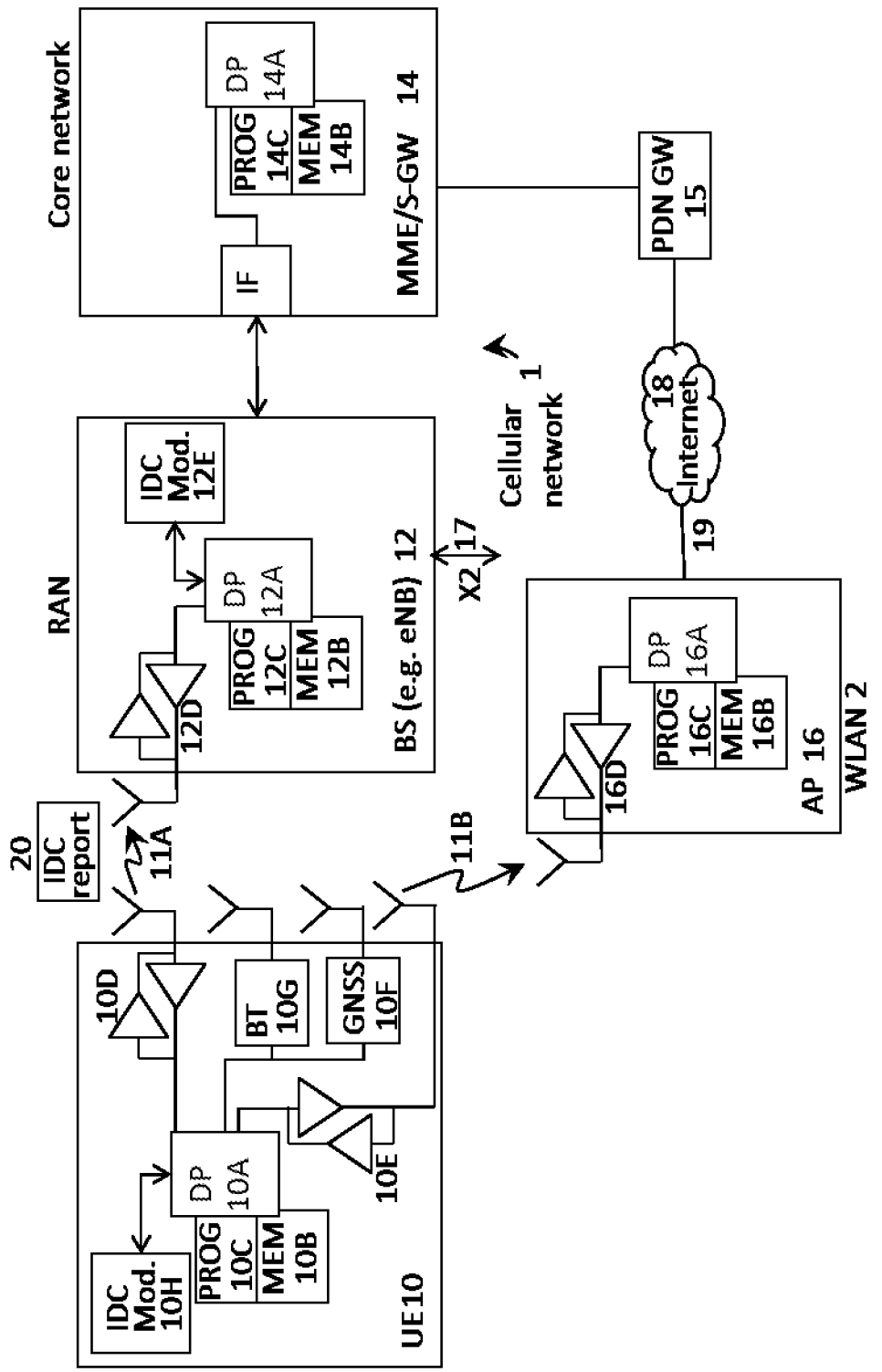
FIG. 2 illustrates a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a first wireless link 11A with an apparatus, such as a mobile communication device which may be referred to as a UE 10, via a network access node, such as a Node B (base station), and more specifically an eNB 12. The wireless network 1 can be implemented as a cellular wireless network, and in some embodiments can be compliant with LTE/LTE-A. The network 1 includes a core network that can include the MME/S-GW 14 functionality shown in FIG. 1A, and which provides connectivity with a further network, such as a telephone network and/or a data communications network (e.g., the Internet).

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) radio transmitter and receiver pair (transceiver) 10D for bidirectional wireless communications with the eNB 12 via one or more antennas.

FIG. 2 also shows a WLAN network 2 that includes at least one access point (AP) 16, and the UE 10 has at least one further radio transmitter and receiver pair (transceiver) 10E for bidirectional wireless communications with the AP 16 via one or more antennas and a second wireless link 11B.

The UE 10 can also include, in addition to or in place of the WLAN transceiver 10E, one or more of a GNSS receiver 10F and a BT transceiver 10G.

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the MME/S-GW 14. The path 13 may be implemented as the S1 interface shown in FIG. 1A. The eNB 12 may also be coupled to another eNB via data/control path 17, which may be implemented as the X2 interface shown in FIG. 1A. Note that in some embodiments there could be an X2 interface 17 between the eNB 12 and the WiFi AP 16.

The eNB 12 as well as the AP 16 may separately or jointly be referred to as a Home Evolved NodeB (HeNB), or as an office access point, a wireless node, or a hotspot as several non-limiting examples.

The MME/S-GW 14 includes a controller, such as at least one computer or a data processor (DP) 14A, at least one non-transitory computer-readable memory medium embodied as a memory (MEM) 14B that stores a program of computer instructions (PROG) 14C, and at least one suitable interface (IF) 14D, such as one compliant with the S1 interface shown in FIG. 1A, for conducting bidirectional communications with the eNB 12. The MME/S-GW 14 can be connected to the Internet 18 via a PDN gateway 15. The implementation of the S-GW separate from, or integrated into, the PDN gateway can be considered as a design choice.

The AP 16 also includes a controller, such as at least one computer or a data processor (DP) 16A, at least one computer-readable memory medium embodied as a memory (MEM) 16B that stores a program of computer instructions (PROG) 16C, and at least one suitable RF transceiver 16D for communication with the UE 10 via one or more antennas. The AP 12 is coupled via a path 19 to the Internet 18 typically via at least one gateway.

At least the PROGs 10C and 12C are assumed to include program instructions that, when executed by the associated data processor 10A and 12A, enable the device to operate in accordance with the exemplary embodiments of this invention, as will be discussed below in greater detail. That is, the exemplary embodiments of this invention can be implemented at least in part by computer software executable by the DP 10A of the UE 10 and by the DP 12A of the eNB 12, or by hardware, or by a combination of software and hardware (and firmware).

More specifically, and for the purposes of implementing the embodiments of this invention, the UE 10 can be assumed to include an IDC function or module 10H and the eNB includes a complementary IDC function or module 12E. The IDC modules 10H and 12E operate in accordance with the embodiments of this invention as described in detail below. The IDC modules 10H and 12E can be implemented at least in part by computer software executable by the DP 10A of the UE 10 and by the DP 12A of the eNB 12, or by hardware, or by a combination of software and hardware (and firmware).

It should be noted that in some embodiments the functionality of the IDC module 12E may be located elsewhere in the network than the eNB 12.

In general, the various embodiments of the UE 10 can include, but are not limited to, cellular mobile devices, smartphones, communicators, tablets, laptops, pads, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B, 14B and 16B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, 14A and 16A may be of any type suitable to the local technical environment, and may include one or more of general purpose computers, special purpose computers, microprocessors, digital signal processors (DSPs) and processors based on multi-core processor architectures, as non-limiting examples.

For convenience, in the following description the (RF) radio transmitter and receiver pair (transceiver) 10D can be referred to as the LTE radio 10D or the LTE transport radio 10D, and the radio transmitter and receiver pair (transceiver) 10E can be referred to as the WiFi radio 10E or the WiFi transport radio 10E. These radios are assumed to include all necessary radio functionality, beyond just the transmitter and receiver per se, such as modulators, demodulators and baseband circuitry as applicable. Also, the reference to an LTE radio implies either LTE (LTE Rel-8) or LTE-A (e.g., Rel. 9, or 10, or higher). Note that by definition an LTE-A compliant radio device can be assumed to be backward-compatible with LTE.

Figures 3A, 3B:
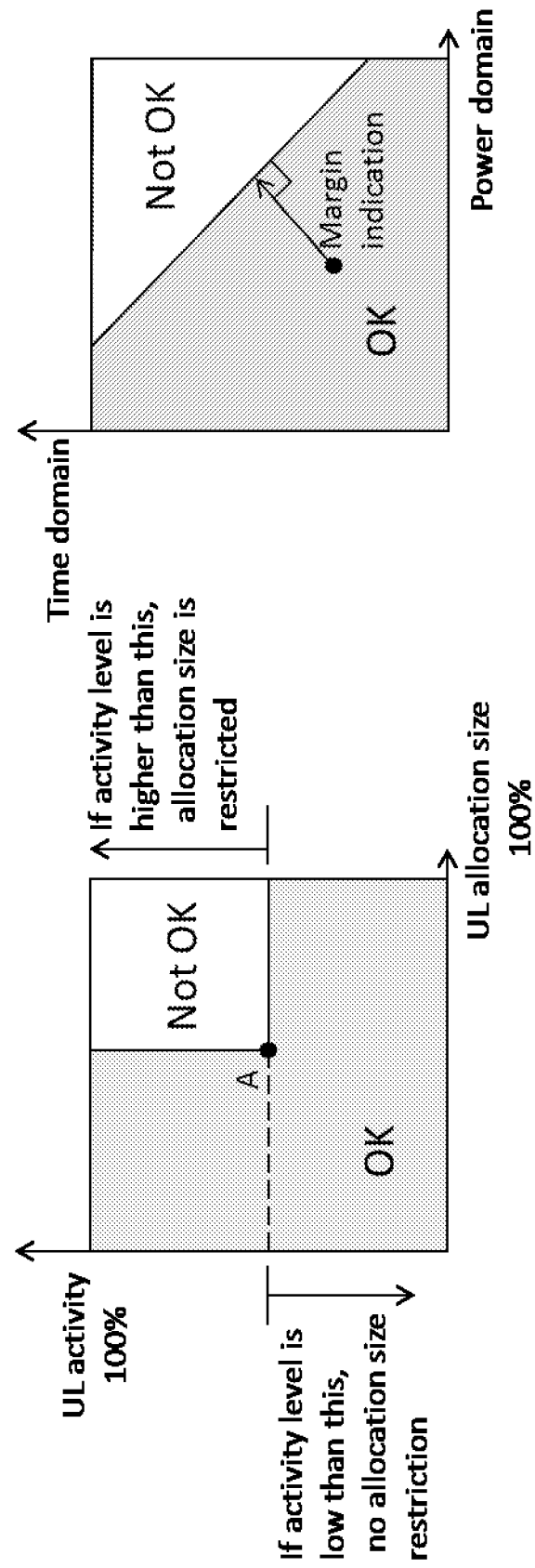
FIG. 3A illustrates an explicit IDC problem indication according to this invention.
FIG. 3B illustrates another embodiment of an IDC problem indication according to this invention.

The exemplary embodiments of this invention provide a novel IDC problem indication (from the LTE UE 10 to the eNB 12) that combines potential and on-going interference into a single explicit report. The indication, also referred to as an IDC report 20 as shown in FIG. 2, contains two orthogonal components as illustrated in FIGS. 3A (and 3B). These components are:

(A) Power domain information (x-axis); and
(B) Time domain information (y-axis).

The IDC report 20 is generated in whole or in part by the IDC module 10H of the UE 10, and the IDC report 20 as received at the eNB 12 is processed in whole or in part by the IDC module 12E.

In accordance with the exemplary embodiments of this invention the UE 10 can send the IDC report 20 as soon as it has considered its radio environment, and determined a so-called "point A" in FIG. 3A. The point A is a reasonable boundary between the regions "IDC problems that can be solved by the UE by itself", and "IDC problems that need a solution by the LTE network". Thus, in principle the IDC report 20 describes to the eNB 12 the LTE radio link conditions/limits within which the UE 10 is able to function properly (i.e., succeed in the current active use case of the UE 10, e.g., LTE VoIP call+Bluetooth headset or LTE+WiFi offloading), without LTE network assistance. If the eNB 12 exceeds these limits it needs to provide an IDC solution for the UE 10.

In the LTE UL the system bandwidth is divided into multiple subbands (i.e., groups of subcarriers) denoted as physical resource blocks (RBs).

The power domain information in the indication of FIG. 3A takes into account the victim radio link margin and transceiver and filter properties, and in principle is descriptive of the maximum uplink power (or Resource Block (RB) allocation size) that the UE 10 can transmit before harmful interference is caused to the victim receiver (i.e., below this threshold the victim receiver can operate regardless of LTE uplink activity).

The power domain limit is linked to the current path loss estimate of the UE 10. The UE 10 then knows that with a particular path loss the Tx power per RB is some value and therefore if the allocation size is N times RB then the Tx power would be x dBm which may, or may not, be detrimental. At this point the UE 10 can determine how many RBs it can transmit without causing an IDC problem.

The time domain information (y-axis) in the IDC report 20 takes into account the victim radio traffic, throughput and latency, and in principle indicates the maximum duty cycle (or some similar time domain activity indicator) that the UE 10 can utilize, while still allowing sufficient time for the victim radio (e.g., the WLAN radio 10E) to exchange its traffic. In the case that the LTE DL reception is impacted by a non-LTE radio transmission, the non-LTE radio is also constrained by the LTE DL activity. One reasonable assumption is that no LTE DL desensitization is allowed by an uncoordinated in-device transmitter (e.g., the WiFi transport radio 10E) and this can be taken into account when deriving the time domain information.

If both power and time domain limits are exceeded simultaneously for the UE 10 the victim radio can be assumed to experience intolerable interference and cannot function properly. As said, this information is available at the UE 10 once it has considered its radio links and the operating environment, and the IDC module 10H can deliver the information to the eNB 12 in the IDC report 20. Upon receiving the IDC report 20 the IDC module 12E of the eNB 12 can make a determination whether to schedule the UE 10 within the indicated limits, or instead derive an IDC solution for the UE 10.

In that the UE 10 can determine operational power and time domain thresholds it can know explicitly what are the conditions for on-going interference. If the same information is indicated to the eNB 12, the confusion between potential and on-going interference (at least on the serving frequency) is solved. This is true so long as the eNB 12 schedules the UE 10 below the threshold levels, there is no on-going interference, and if the thresholds are exceeded, there is on-going interference and either a FDM or a TDM solution is necessary to satisfy UE 10 quality of service requirements on each active radio link. Applying an LTE power control solution is also straightforward in this case, since the power domain limit is in fact the same as the required assistance information for power control.

As was explained above, FIG. 3A expresses the basic concept for the LTE uplink. Using this indication method from the UE 10 to the LTE network the UE 10 is enabled to inform through the "Point A" which UL operation "areas" in terms of combined UL time domain activity and UL transmitted power/UL allocation size are possible without inducing IDC problems, and which combinations should be avoided in the network scheduling and configuration decisions. In this manner the freedom for network decisions of how to aid the UE 10 with an IDC problem can be maintained.

In the case ISM transmitter causes interference to the LTE DL, the ISM transmissions can be constrained by the LTE DL sub-frames, and a similar time domain activity limit can be used on the LTE side to satisfy the ISM radio throughput requirements. Since LTE UL and DL activities are tightly coupled (i.e., grants, acknowledgements) it should be sufficient to indicate just one time domain activity threshold.

The combined power/time domain IDC indication (IDC report 20) in accordance with the exemplary embodiments of this invention beneficially addresses and solves the problems related to on-going interference on the serving frequency and potential interference on the serving frequency.

The foregoing aspects of this invention are now described in even greater detail, with the power domain aspects being described first followed by the time domain aspects.

Power Domain

LTE UL power can be as much as +23 dBm at the antenna. Typical antenna isolation between LTE and ISM band antennas can be about 10 dB in a small device such as a mobile phone. This implies that the ISM receiver can expect up to a +13 dBm blocking signal at its antenna port. Because of the close proximity of the LTE frequency bands 40 and 7 to the 2.4 GHz ISM band, the ISM band filter may not be able to attenuate the blocker sufficiently when the LTE radio 10D is transmitting at close to full power. Reference in this regard can be made to FIG. 4, reproduced from Filter Recommendations for Coexistence with LTE and WiMax, Bluetooth SIG, 31.3.2010.

FIG. 4 illustrates an example of performance degradation of a Bluetooth receiver due to an unwanted blocker (e.g., in-device transmitter of the LTE radio 10D). At approximately the −20 dBm level at the receiver input (after the BT band filter, which provides some attenuation for the LTE UL blocking signal) the receiver begins experiencing significant (5-6 dB in this case) performance losses. Note however that the BT link budget should be known in order to estimate the impact on the radio link.

Figure 5:
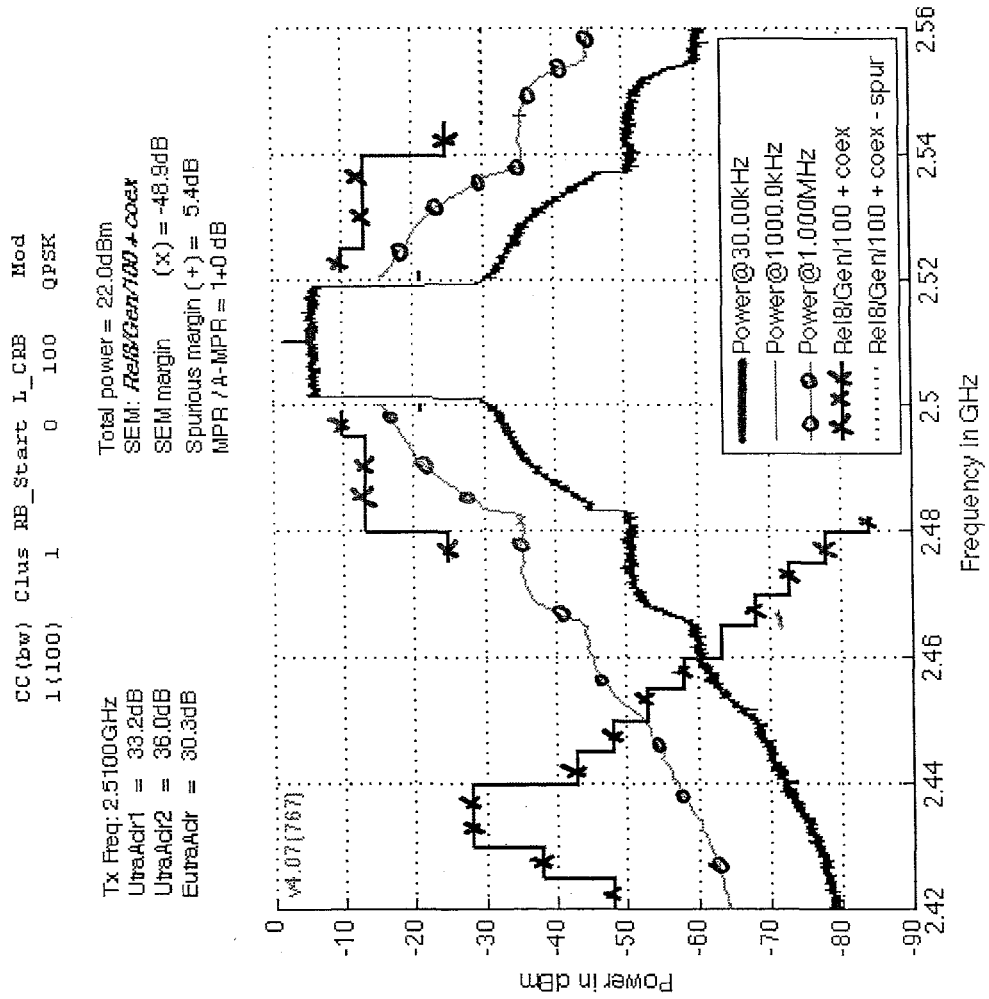
FIG. 5 illustrates unwanted emissions of a full power LTE uplink transmission.

Another problem from the LTE UL is the out-of-band unwanted emissions that are experienced by the ISM receiver channel. Especially close to the LTE band edge the LTE transmit filters do not attenuate the unwanted emissions significantly due to yield considerations/temperature drift and so forth. FIG. 5 illustrates this effect.

The "staircase" emission mask is an estimation of allowed emissions that would not cause significant desensitization of the in-device ISM band receiver. This assumption takes into account an exemplary LTE duplex filter, antenna isolation, and receiver noise figure. At the edge of the ISM band (2483 MHz) the mask is exceeded by 48.9 dB and it can be estimated that above 2450 MHz some desensitization would occur. If the LTE UL transmit power is less, or the resource allocation narrower, there would be reduced unwanted emissions in the ISM band.

The actual impact on the ISM band receiver depends on the ISM link budget. Unlike in LTE, the ISM band radio systems typically do not have closed loop power control and typically always transmit at full output power. Typical cases for Bluetooth have a large margin in the link budget (devices close to each other) but this is not always the case. In addition, the WiFi radio 10E can have a large margin in the link budget if the AP 16 is close.

Based on the above discussion it should be apparent that any IDC solution would benefit from dynamic activation/deactivation, and that the UE 10 has the best knowledge of when to use such solutions. Further, the UE 10 can decide based on the current radio environment (e.g., operating frequencies, output power levels, receive power levels, etc.), which transmit power levels would be harmful for the victim link budget. This determination assumes calibration of the UE 10 to take into account differences in transceiver and filter implementations and/or the use of an on-line measurement scheme.

A basic problem then is how to define a procedure to provide a simple and flexible solution which can provide: 1) the UE 10 IDC 20 report to the eNB 12 when an IDC problem occurs, 2) freedom in the UE implementation for hardware choices and measurement details, 3) a function to specify the performance requirements for UE 10 when and how it needs to indicate that is has experienced an UL IDC problem (or a predicted (potential) IDC problem), and 4) if possible, a simple technique that networks can implement and apply utilizing existing mechanisms when feasible.

Figure 6:
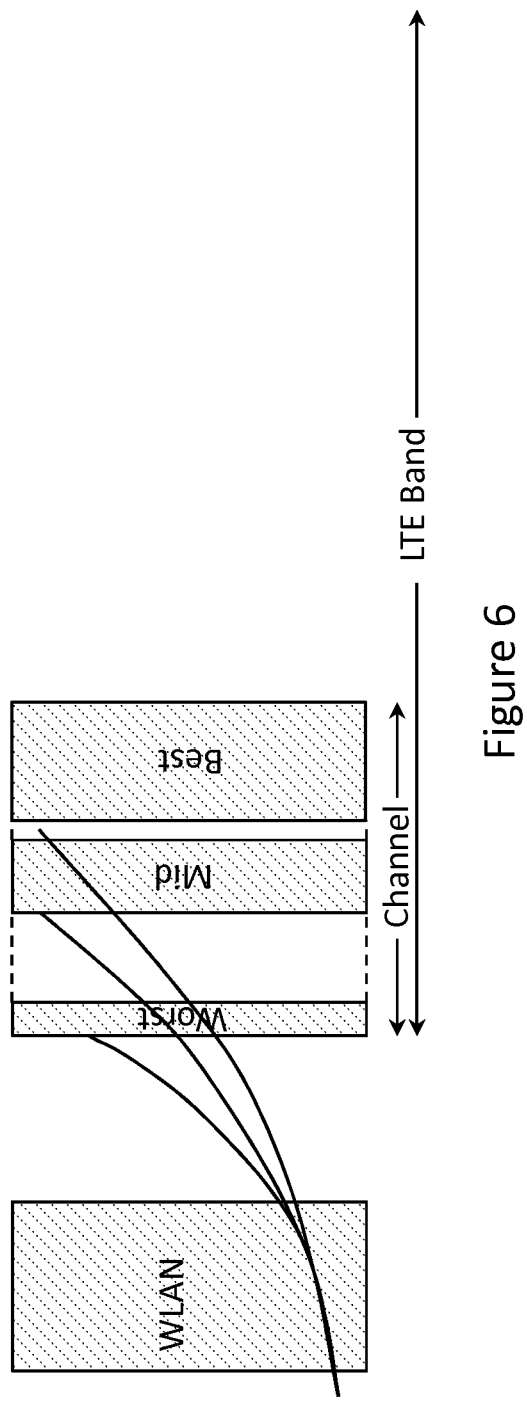
FIG. 6 illustrates a frequency domain illustration of an LTE transmission in close proximity to a WLAN channel as a non-limiting example of one LTE and ISM band coexistence scenario.

A WLAN-E-UTRAN (LTE) IDC embodiment is used as a non-limiting example. Reference is made to FIG. 6 in this regard for showing a frequency domain illustration of an LTE transmission in close proximity to a WLAN channel as a non-limiting example of one LTE and ISM band coexistence scenario.

The experienced interference in the WLAN radio 10E depends on multiple factors:

(1) Where in the frequency band or channel (frequency wise) the LTE UL allocation is placed (the closer to the WLAN band the more detrimental is the situation).
(2) What is the LTE UL power to be used (the higher the power the more detrimental is the situation)
(3) The LTE UL allocation bandwidth.
(4) The margin in the WLAN receiver link budget.
(5) The transmission activity level, i.e., what percentage of the time the LTE UL is active (this time domain issue is discussed below).

Another factor to consider is which frequency band is used. However, for this discussion it is assumed that only those bands that have the potential to cause some IDC interference are considered.

Taking the above into account it could be the case that the UE 10 is operating on a band that potentially could cause an UL IDC problem (e.g., the ISM transceiver cannot operate in this condition). However, even if the UL allocation is full BW, if the UL transmission power is sufficiently low there would not be any UL IDC problem (i.e., the ISM transceiver can operate in this interference condition although there is some interference). On the other hand the UL allocation could be rather narrow but with high UL transmission power, and could be allocated near the band border to the problematic IDC band. This condition could result in an UL IDC problem.

In order for the LTE network to address the situation with a potential IDC problem what is needed is a procedure that enables the UE 10 to indicate to the LTE network information concerning, for example:

(A) The presence of a possible IDC problem (under given conditions); and
(B) Information on UL power used with the current allocation.

This latter information can include, for example, the UL power is not high enough to trigger an IDC problem and, thus, there would exist some margin in UL power before IDC problem may occur; the UL power is too high (UL power is above the limit, which is likely to cause an IDC problem); or an UL power limitation to indicate which power levels would not cause an IDC problem and which UL power levels are likely to cause an IDC problem.

Also of interest is allocation information related to band border allocations (e.g., with the currently used UL power) as is also illustrated in FIG. 6 (for example, Worst case, Mid case, Best case and Full BW limit).

This type of information can provide further flexibility for the LTE network when determining how to assist the UE 10 with an IDC problem or a potential IDC problem.

The procedures to address and eliminate or at least reduce the IDC problem are sufficiently flexible to accommodate different UE 10 implementations with respect to filtering, measurements and so forth. It is also important that the LTE network does not need to know (or guess) the specific UE 10 implementation when interpreting the IDC report 20 sent by the UE 10. Instead it is most desirable that based simply on the IDC report 20 the LTE network can derive actions to be taken to remove or at least reduce an IDC problem in the UE 10.

The power domain limit (x-axis in FIG. 3A) is linked to the current path loss estimate that the UE 10 has. Then UE 10 knows that with this path loss the Tx power per RB is some value and therefore if the allocation size is N times RB then the Tx power would be x dBm, which may or may not be harmful. From there the UE 10 can determine how many RBs it can transmit without inducing an IDC problem. The granularity of this determination can be implementation specific.

Time Domain

In addition to the power domain, the observed interference also depends on the activity of a radio in time. For example, if there is currently no traffic in the WLAN radio 10E then there would be no restrictions on the LTE side. Alternatively, if the there is currently maximum throughput of data in the WLAN radio 10E than on the LTE side this could imply that severe restrictions be placed on LTE activity if the WLAN radio 10E is to be supported.

In a simplest form the time domain limit on LTE activity could be a bare duty cycle. If averaged over a certain period the duty cycle gives an indication of how much time (what percentage of the total time) the non-LTE radio has for its data transmissions. Note that ISM band radios can adapt quite well to short (e.g., 1-2 ms) gaps, because on the inherently non-deterministic unlicensed band this is a necessary condition for operation.

In 3GPP RAN2 there has been general discussion concerning IDC and the assistance information the UE 10 can provide for achieving LTE network-controlled solutions. For time division multiplex (TDM) solutions the assistance information could be, e.g., a suitable active/inactive time in the case of discontinuous reception (DRX). The time domain information (LTE activity level) presented in the context of this invention can be the same or similar to this TDM assistance information.

The IDC report 20 could be provided by the UE 10 to the LTE network, for example, in L1, MAC or RRC signaling. One suitable format could be to provide the IDC report 20 as a MAC control element (CE) or in RRC signaling using event-based or periodic measurement reporting. Additional parameters such as, for example, margins or thresholds, e.g., for identifying how far the UE 10 is from the Point A in FIG. 3A can also be taken into account to identify when the reporting from the UE 10 to the eNB 12 should take place. The LTE network can provide some of the reporting-related parameters to the UE 10, although the final decision of a potential/likely IDC problem is preferably performed by UE 10, as would be the final reporting decision including the content of the IDC report 20 and also the timing if an event-triggered type of reporting is used.

Basically, and referring again to FIG. 3A, in one non-limiting example the IDC report 20 can be composed of a pair of numbers, one indicating an x-axis (power domain) value and the other indicating a y-axis (time domain) value that are descriptive of the current operational condition of the UE 10.

The exemplary embodiments of this invention also enable the use of reference allocations. In this aspect of the invention there can be defined a given set (one or more) of reference allocations in the problematic UL IDC blocks (see again, for example, FIG. 6). Based on the reference allocations the UE 10 would report/indicate back to network which sort of limitation there would be.

As one non-limiting example consider the following scenario. The UE 10 could report back that for the worst case allocation the UL power allocation can be a given maximum value. The UE 10 could report back that for best case allocation using full UL power the block allocation boundary would be x. The UE 10 could report (not) usable frequencies (inside the channel/carrier).

Alternatively the UE 10 could indicate the 'curve' (e.g., some linear approximation) of the possibly used UL power when considering the full BW allocation and other combinations. For example, the UE 10 could indicate what a lower resource block allocation boundary is where it can be allocated in full BW if maximum UL power is used. Additionally the UE 10 could report the lower resource block allocation boundary where it can be allocated in full BW if minimum UL power is used. From this reported information the network (e.g. the eNB 12) is then able to deduce the UE 10 'operating' area for the UL allocation.

The UE 10 can also indicate the border boundary for those allocations with a given power setting (here maximum power). For example, based on the current UL allocation the UE 10 could indicate what would be the lower resource block allocation possible using this UL power and allocation.

The UE 10 can also indicate the boundary (in resource block/carrier) for the currently used UL power for the remaining resource allocations (those away from the problem area). This information then enables the network to know where to actually schedule the UE 10 in the UL. This 'border' would typically move or shift according to the allocated UL power, but it would allow freedom in the network scheduler to allocate UL resources for the UE 10 with the given power up to the full indicated BW.

FIG. 3B shows one exemplary embodiment of a modification to IDC report 20 that includes the above mentioned margin indication.

Based on the foregoing it should be apparent that the exemplary embodiments of this invention provide a method, apparatus and computer program(s) to provide enhanced in-device coexistence for a user device that operates with a cellular network, such as the LTE network.

Figure 7:
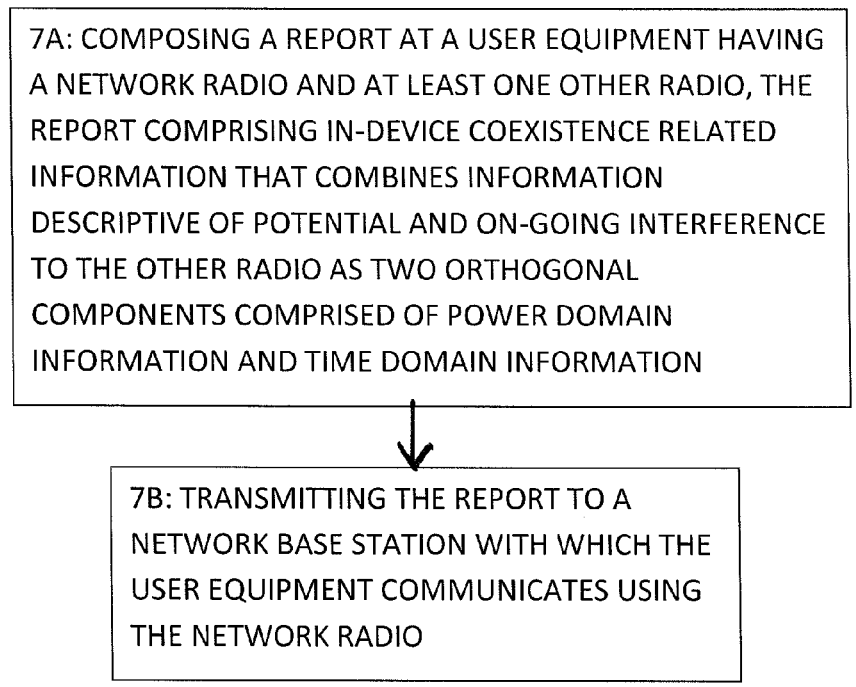
FIG. 7 illustrates a logic flow diagram that illustrates the operation of a method, and a result of execution of computer program instructions embodied on a computer readable medium, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, composing a report at a user equipment having at least one network radio and at least one other radio, the report comprising in-device coexistence related information that combines information descriptive of potential and on-going interference to the at least one other radio as two orthogonal components comprised of power domain information and time domain information. At Block 7B there is a step of transmitting the report to a network base station with which the user equipment communicates using the at least one network radio.

The method of FIG. 7, where the power domain information is descriptive of a limit on a maximum uplink power, or resource block allocation size, that the user equipment can transmit to the base station using the at least one network radio before harmful interference is caused to the at least one other radio of the user equipment.

The method of the preceding paragraph, where the limit is a function of a current path loss estimate of the user equipment.

The method of FIG. 7, where the time domain information is descriptive of activity in time of the at least one other radio of the user equipment.

The method of the preceding paragraph where the time domain information is a duty cycle averaged over a period of time and indicates what percentage of the total time the at least one other radio has for its communications.

The method of FIG. 7 and the foregoing several paragraphs descriptive of FIG. 7, where if both a power domain limit and a time domain limit are exceeded simultaneously it is assumed that a victim radio of the user equipment is experiencing intolerable interference and cannot function properly without intervention from the network.

The method of FIG. 7 and the foregoing several paragraphs descriptive of FIG. 7, where the network base station is an evolved NodeB and where the at least one other radio is one or more of a Wi-Fi-radio, a Bluetooth radio, and a satellite positioning system radio.

The method of FIG. 7 and the foregoing several paragraphs descriptive of FIG. 7, where the report is sent using one of MAC or RRC signaling to the network base station.

The method of FIG. 7 and the foregoing several paragraphs descriptive of FIG. 7, where the report is sent in response to a trigger condition being satisfied, or is sent periodically.

The various blocks shown in FIG. 7 may be viewed as method steps, and/or as operations that result from operation of computer program code, and/or as a plurality of coupled logic circuit elements constructed to carry out the associated function(s).

As such, the exemplary embodiments of this invention also encompass a non-transitory computer-readable medium that contains software program instructions, where execution of the software program instructions by at least one data processor results in performance of operations that comprise execution of the method shown in FIG. 7 and the foregoing several paragraphs descriptive of FIG. 7.

The exemplary embodiments of this invention also encompass an apparatus that comprises at least one data processor and at least one memory including computer program code. The at least one memory and computer program code are configured, with the at least one data processor, to cause the apparatus at least to compose a report at a user equipment having at least one network radio and at least one other radio, the report comprising in-device coexistence related information that combines information descriptive of potential and on-going interference to the at least one other radio as two orthogonal components comprised of power domain information and time domain information, and to transmit the report to a network base station with which the user equipment communicates using the at least one network radio.

The exemplary embodiments of this invention also encompass an apparatus that comprises means for composing a report at a user equipment (e.g., data processor 10A, memory 10B, program 10C, IDC module 19H) having at least one network radio (10D) and at least one other radio (10E, 10F, 10G), the report comprising in-device coexistence related information that combines information descriptive of potential and on-going interference to the at least one other radio as two orthogonal components comprised of power domain information and time domain information. The apparatus further comprises means for transmitting the report (e.g., data processor 10A, memory 10B, program 10C, transceiver 10D) to a network base station with which the user equipment communicates using the at least one network radio.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different types of radios (e.g., Wi-Fi, BT, GNSS, etc.) are not intended to be limiting in any respect, as these various different types of radios may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   composing a report at a user equipment having at least one network radio and at least one other radio, the report comprising in-device coexistence related information that combines information descriptive of potential and on-going interference to the at least one other radio as two orthogonal components comprised of power domain information and time domain information; and
   transmitting the report to a network base station with which the user equipment communicates using the at least one network radio,
   wherein if both a power domain limit and a time domain limit are exceeded simultaneously it is assumed that the at least one other radio of the user equipment is experiencing intolerable interference and cannot function properly without intervention from the network.

2. The method of claim 1, wherein the power domain information is descriptive of a limit on a maximum uplink power, or resource block allocation size, that the user equipment can transmit to the base station using the at least one network radio before harmful interference is caused to the at least one other radio of the user equipment.

3. The method of claim 2, wherein the limit is a function of a current path loss estimate of the user equipment.

4. The method of claim 1, wherein the time domain information is descriptive of activity in time of the at least one other radio of the user equipment.

5. The method of claim 4, wherein the time domain information is a duty cycle averaged over a period of time and indicates what percentage of the total time the at least one other radio has for its communications.

6. The method of claim 1, wherein the network base station is an evolved NodeB and wherein the at least one other radio is one or more of a Wi-Fi-radio, a Bluetooth radio, and a satellite positioning system radio.

7. The method of claim 1, wherein the power domain information and time domain information define a boundary or a margin to a boundary beyond which the at least one other radio is experiencing intolerable interference and cannot function properly without intervention from the network.

8. An apparatus comprising at least one processor; and at least one memory including computer program code; the at least one memory and the computer program code configured to, with the at least one processor, cause the apparatus at least to:
   compose a report at the apparatus having at least one network radio and at least one other radio, the report comprising in-device coexistence related information that combines information descriptive of potential and on-going interference to the at least one other radio as two orthogonal components comprised of power domain information and time domain information; and
   transmit the report to a network station with which the apparatus communicates using the at least one network radio,
   wherein if both a power domain limit and a time domain limit are exceeded simultaneously it is assumed that the at least one other radio of the user equipment is experiencing intolerable interference and cannot function properly without intervention from the network.

9. The apparatus of claim 8, wherein the power domain information is descriptive of a limit on a maximum uplink power, or resource block allocation size, that the apparatus can transmit to the base station using the at least one network radio before harmful interference is caused to the at least one other radio of the apparatus.

10. The apparatus of claim 9, wherein the limit is a function of a current path loss estimate of the user equipment.

11. The apparatus of claim 8, wherein the time domain information is descriptive of activity in time of the at least one other radio of the user equipment.

12. The apparatus of claim 8, wherein the time domain information is a duty cycle averaged over a period of time and indicates what percentage of the total time the at least one other radio has for its communications.

13. A non-transitory computer readable medium tangibly encoded with a computer program executable by a processor to perform actions comprising:
   composing a report at a user equipment having at least one network radio and at least one other radio, the report comprising in-device coexistence related information that combines information descriptive of potential and on-going interference to the at least one other radio as two orthogonal components comprised of power domain information and time domain information; and transmitting the report to a network base station with which the user equipment communicates using the at least one network radio, wherein if both a power domain limit and a time domain limit are exceeded simultaneously it is assumed that the at least one other radio of the user equipment is experiencing intolerable interference and cannot function properly without intervention from the network.

14. The computer readable medium of claim 13, wherein the power domain information is descriptive of a limit on a maximum uplink power, or resource block allocation size, that the user equipment can transmit to the base station using the at least one network radio before harmful interference is caused to the at least one other radio of the user equipment.

15. The computer readable medium of claim 14, wherein the limit is a function of a current path loss estimate of the user equipment.

16. The computer readable medium of claim 13, wherein the time domain information is descriptive of activity in time of the at least one other radio of the user equipment.

17. The computer readable medium of claim 13, wherein the time domain information is a duty cycle averaged over a period of time and indicates what percentage of the total time the at least one other radio has for its communications.

18. The computer readable medium of claim 13, wherein the power domain information and time domain information define a boundary or a margin to a boundary beyond which the at least one other radio is experiencing intolerable interference and cannot function properly without intervention from the network.

* * * * *